United States Patent [19]

Heytler et al.

[11] Patent Number: 4,482,371
[45] Date of Patent: Nov. 13, 1984

[54] METHOD AND COMPOSITION FOR SUPPRESSING THE NITRIFICATION OF AMMONIUM NITROGEN IN SOIL

[75] Inventors: Peter G. Heytler; Frank D. Marsh, both of Wilmington, Del.

[73] Assignee: E. I. Du Pont de Nemours and Company, Wilmington, Del.

[21] Appl. No.: 485,004

[22] Filed: Apr. 14, 1983

[51] Int. Cl.³ ................................................ C05C 9/00
[52] U.S. Cl. .......................................... 71/27; 71/902; 71/903

[58] Field of Search ...................... 71/27, 902, 903, 7

[56] References Cited

U.S. PATENT DOCUMENTS 3,305,346  2/1967  Dowbenko .................... 71/902 X
4,226,609  10/1980  Katz et al. ...................... 71/902 X

*Primary Examiner*—Ferris H. Lander

[57] ABSTRACT

Certain polychloromethyl-substituted benzene and naphthalene compounds are useful for suppressing the nitrification of ammonium nitrogen in soil.

15 Claims, No Drawings

METHOD AND COMPOSITION FOR SUPPRESSING THE NITRIFICATION OF AMMONIUM NITROGEN IN SOIL

BACKGROUND OF THE INVENTION

This invention relates to a method of inhibiting the growth of Nitrosomonas, a method of suppressing the nitrification of ammonium nitrogen in soil and compositions useful for these purposes.

Since most plants obtain the greater part or all of their nitrogen requirements from the soil, it is one of the most important agricultural problems to provide nutrient nitrogen for the growth of plants in soil. Available nitrogen in soil is present in the three forms of organic nitrogen, ammonium nitrogen and nitrate nitrogen. Among them, ammonium nitrogen and nitrate nitrogen are well absorbed from soil and utilized by plants. Organic nitrogen, which may originate from manure, crop residues and organic fertilizers, is typically converted by soil bacteria to ammonia or ammonium salts, in which form it becomes available to the plant.

In agricultural practice, ammonium nitrogen is frequently provided either directly as anhydrous ammonia or ammonium salts, or indirectly as organic fertilizers such as urea which release ammonia in the soil. A valuable characteristic of ammonium nitrogen is that it reversibly binds to soil particles by cation exchange. In this form it resists leaching from the soil, yet remains readily available to plant roots. However, widespread soil bacteria of the genus Nitrosomonas oxidize ammonia to nitrite ion which later undergoes both spontaneous and microbial oxidation to nitrate. This process, termed nitrification, does not immediately decrease available soil nitrogen but does lead to several undesirable consequences. Nitrite and nitrate, being anions, no longer bind to soil and are rapidly leached beyond reach of the crop root system. In addition, they are degraded by a variety of soil microbes to free nitrogen and nitrogen oxides. The resulting loss of fertilizer nitrogen may amount to as much as forty percent of that applied, and is reflected in lower crop yields. Other indirect consequences include contamination of streams and aquifers by the leached nitrite and nitrate ions and pollution of air by their nitrogen oxide products.

In order to prevent the loss of nitrogen from soil and to improve the rate of utilization of nitrogen by plants, it is necessary to suppress the nitrification of ammonium nitrogen by soil bacteria. One way to accomplish this is to inhibit the growth of the nitrifying soil bacteria *Nitrosomonas* spp.

At least two products are presently available commercially for the purpose of inhibiting soil nitrification. These products are etridiazol, marketed by Olin Mathieson Chemical Corporation under the trademark "Dwell", and nitrapyrin, marketed by the Dow Chemical Company under the trademark "N-Serve." There is a constant need for nitrification inhibitors which are more effective and/or more economical than those currently available.

SUMMARY OF THE INVENTION

It has now been found that compounds of Formulas I or II are useful for inhibiting the growth of *Nitrosomonas* spp. and thus for suppressing the nitrification of ammonium nitrogen in soil.

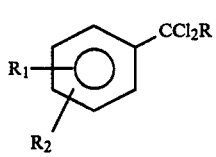
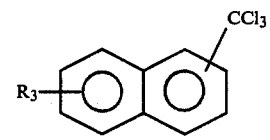

wherein
R is Cl or $CH_3$;
$R_1$ is H, F, Cl, Br, CN, $NO_2$, $SO_2R_4$, $CO_2R_5$ or methyl substituted with 1–3 atoms of F or Cl;
$R_2$ is H, Cl, $NO_2$, $CF_3$, $C_1$–$C_4$ alkyl or $C_1$–$C_4$ alkoxy;
$R_3$ is H, Cl, $NO_2$ or $SO_2CH_3$, $CH_3$, $OCH_3$; and
$R_4$ and $R_5$ are independently $C_1$–$C_3$ alkyl provided that when $R_2$ is other than H and when $R_1$ and $R_2$ are bonded to the 2, 6 positions of the benzene ring, then $R_1$ and $R_2$ are both Cl.

This invention therefore relates to agricultural compositions containing compounds of Formulas I and II, to fertilizer compositions containing compounds of Formulas I and II, to the method of using compounds of Formulas I and II to inhibiting the growth of Nitrosomonas, and to methods of using compounds of Formulas I and II to suppress nitrification of ammonium nitrogen in soil. It is understood that the ammonium nitrogen in the soil may derive from administered fertilizer containing ammonium nitrogen or may be formed by conversion of an organic nitrogen constituent in soil or by conversion of organic fertilizer administered to soil.

Compositions containing certain compounds of Formulas I and II and methods of using certain of those compounds as nitrification inhibitors are preferred for reasons of their high effectiveness and/or ease of use. These preferred groups of compounds, in order of increasing preference, are:
1. Those of Formula I where
   R is Cl; and
   $R_2$ is H, Cl, $NO_2$, $CF_3$, $CH_3$ or $OCH_3$.
2. Those of preference 1 where
   $R_2$ is H, Cl, $NO_2$ or $CF_3$.
3. Those of preference 2 where
   $R_1$ is F, Cl, $NO_2$, $CF_3$, $CCl_3$, $SO_2R_4$, $CO_2CH_3$ or CN; and
   $R_2$ is H, $NO_2$ or $CF_3$.
4. Those of preference 3 where
   $R_1$ is $NO_2$, $CF_3$, $CCl_3$ or $SO_2CH_3$;
   $R_2$ is H; and
   $R_1$ is bonded to the 3- or the 4-position of the benzene ring.

Two compounds are specifically preferred for use in the compositions and methods of this invention. These compounds are:
4-nitro-α,α,α-trichlorotoluene; and
4-(methylsulfonyl)-α,α,α-trichlorotoluene.

DETAILED DESCRIPTION

The compounds of Formulas I and II can be prepared in a number of ways. In one method, an alkyl aromatic is chlorinated to form a chloroalkyl aromatic, and other functional groups are optionally added by methods well known to those skilled in the art. See, for example, Buchler and Pearson, "Survey of Organic Synthesis," Wiley-Interscience, and Sconce, "Chlorine, Its Manufacture, Properties and Uses," American Chemical Society Monograph Series, Reinhold Publishing Corporation, New York, Chapman and Hall, Ltd., London (1962).

In another method, substituted alkyl aromatics ar chlorinated to yield the compounds of Formulas I and II. The method of chlorination will depend on the nature of the other substituents on the aromatic ring. When the net effect of the ring substituents is electron-donating, conventional chlorination methods may be used. When the net effect is electron-withdrawing, particularly effective methods are described in U.S. Pat. No. 4,226,783, issued to Marsh on Oct. 7, 1980, and U.S. Pat. No. 4,098,831, issued to Marsh on July 4, 1978.

The following examples illustrate the preparation of certain compounds of Formula I.

EXAMPLE 1

Preparation of 4-nitro-$\alpha,\alpha,\alpha$-trichlorotoluene (a) p-Nitrotoluene (205.71 g, 1.5 mole), carbon tetrachloride (1320 ml) and yellow mercuric oxide (680 g, 3.13 mole) were added to a 3-neck flask equipped with a mechanical stirrer, thermometer, gas inlet and dry ice condenser. The mixture was stirred at 50°–60° C. while adding chlorine (437 g, 6.21 mole, scrubbed through concentrated sulfuric acid) at a rate of approximately 2500 cc/min. The mixture was stirred at 50°–60° C. until all of the benzyl hydrogens were replaced by chlorine (10–24 hours). The reaction is conveniently followed by H-nmr.

The mixture was filtered and the filter cake washed with methylene chloride (3×250 ml). The combined filtrates were washed with 10% sodium hydroxide (2×400 ml) and then with water (1×400 ml). The organic layer was dried (MgSO$_4$) and the solvent removed on a rotary evaporator to give the title compound, a pale yellow crystalline solid (347.8 g, m.p. 47°–48°; yield 96.4%, purity by Hplc 99.7%).

Alteratively, p-nitrotoluene may be reacted directly with Cl$_2$O was described in U.S. Pat. No. 4,226,783, to prepare the title compound.

(b) t-Butyl alcohol (654 ml) was added to sodium hydroxide (160 g) dissolved in water (350 ml). The two-phase mixture was stirred and cooled at 10°–15° while chlorine (40 g, 0.56 mole) was added as a gas over the surface during 0.5 hour. The temperature was gradually raised to 45°–50° as p-nitrobenzyl chloride (40 g, 0.23 mole) was added in small portions during 1¼ hour. The mixture was heated for an additional 0.5 hour after addition was complete. The mixture was cooled to room temperature and the layers separated. The water layer was extracted with methylene chloride and the extract combined with the t-butanol layer, dried and the solvent removed on a rotary evaporator to give the title compound, a pale yellow crystalline solid (99% by Hplc).

EXAMPLE 2

Preparation of 4-(methylsulfonyl)-$\alpha,\alpha,\alpha$-trichlorotoluene

Methyl p-tolylsulfone (100 g, 0.59 mole), carbon tetrachloride (1500 ml) and mercuric oxide (211 g) were added to a 3-necked flask equipped with a mechanical stirrer, gas inlet, dry-ice condenser and thermometer. The mixture was stirred and maintained at 50°–60° while adding chlorine gas (scrubbed through sulfuric acid) at a rate of approximately 1600 cc/min for 35 minutes (155 g). At this point chlorine monoxide started refluxing and chloride addition was discontinued. The mixture was stirred and heated for a total of 7 hours and additional chlorine (65 g) and mercuric oxide (100 g) were added as needed to complete the reaction which can be readily monitored by N-nmr.

The product was filtered and the filter cake washed with methylene chloride. The combined filtrates were washed with 15% aqueous sodium hydroxide and then with water. The organic layer was dried (MgSO$_4$), filtered and the solvent removed on a rotary evaporator to give a white crystalline solid (144.6 g, yield 98.2%). The product was recrystallized from chloroform/petroleum ether to give the title compound, m.p. 163°–165° C.

Using procedures analogous to those described above and those exemplified in Examples 1 and 2, the compounds listed in Tables I and II can be prepared.

TABLE I

Structure: benzene ring with $R_1$, $R_2$ substituents and $CCl_2R$ group

| R | $R_1$ | $R_2$ | Properties |
|---|---|---|---|
| Cl | 4-NO$_2$ | H | M.P. 45.8–46.9 |
| Cl | 3-NO$_2$ | H | $n^{31}{}_D$ 1.5762 |
| Cl | 4-CF$_3$ | H | B.P. 36°/1 mm |
| Cl | 4-CCl$_3$ | H | M.P. 108–110 |
| Cl | 4-SO$_2$CH$_3$ | H | M.P. 168–168.8 |
| Cl | 4-CN | H | M.P. 40.5–41.7 |
| Cl | 2-CN | H | M.P. 98.9–100 |
| Cl | 4-F | H | |
| Cl | 4-F | 3-NO$_2$ | |
| Cl | 3-F | 4-CF$_3$ | |
| Cl | 4-Cl | H | |
| Cl | 2-Cl | 4-NO$_2$ | B.P. 82–85/2 mm |
| Cl | 3-Cl | 4-CF$_3$ | |
| Cl | 3-NO$_2$ | 4-NO$_2$ | M.P. 70.3–71.4 |
| Cl | 3-NO$_2$ | 4-CF$_3$ | |
| Cl | 3-CF$_3$ | 5-CF$_3$ | |
| Cl | 3-CCl$_3$ | 5-NO$_2$ | B.P. 115/0.5 mm |
| Cl | 3-CCl$_3$ | 5-CF$_3$ | |
| Cl | 3-SO$_2$CH$_3$ | H | |
| Cl | 3-SO$_2$CH$_3$ | 5-NO$_2$ | |
| Cl | 3-SO$_2$CH$_3$ | 5-CF$_3$ | |
| Cl | 4-CO$_2$CH$_3$ | H | |
| Cl | 3-CO$_2$CH$_3$ | 5-NO$_2$ | |
| Cl | 3-CO$_2$C$_3$H$_7$ | 5-CF$_3$ | |
| Cl | 3-CO$_2$C$_2$H$_5$ | 5-NO$_2$ | |
| Cl | 3-CO$_2$CH$_3$ | 4-Cl | |
| Cl | 3-CCl$_3$ | 4-Cl | |
| Cl | 4-CN | 2-Cl | M.P. 68–69.7 |
| Cl | 3-SO$_2$CH$_3$ | 5-NO$_2$ | |
| Cl | 3-CN | 4-NO$_2$ | |
| Cl | 3-CN | 4-CF$_3$ | |
| Cl | 3-Cl | 5-CF$_3$ | |
| Cl | 3-Cl | 4-CH$_3$ | |
| Cl | 3-F | 4-CH$_3$ | |
| Cl | 3-NO$_2$ | 5-CH$_3$ | |
| Cl | 3-CN | 4-CH$_3$ | |
| Cl | 3-SO$_2$CH$_3$ | 5-CH$_3$ | |
| Cl | 3-CF$_3$ | 4-CH$_3$ | |
| Cl | 3-CO$_2$CH$_3$ | 5-CH$_3$ | |
| Cl | 4-CCl$_3$ | 3-CH$_3$ | |
| Cl | 3-CH$_3$ | 4-OCH$_3$ | |
| Cl | 3-Cl | 4-OCH$_3$ | |
| Cl | 3-F | 5-OCH$_3$ | |
| Cl | 3-NO$_2$ | 4-OCH$_3$ | |
| Cl | 3-CN | 5-CH$_3$ | |
| Cl | 3-SO$_2$CH$_3$ | 4-CH$_3$ | |
| Cl | 3-CO$_2$CH$_3$ | 5-CH$_3$ | |
| Cl | 3-CCl$_3$ | 4-CH$_3$ | |
| Cl | 4-CHCl$_2$ | H | |
| Cl | 4-CHCl$_2$ | 3-NO$_2$ | |
| Cl | 4-CH$_2$Cl$_2$ | 3-CN | |
| Cl | 4-CH$_2$Cl$_2$ | 5-SO$_2$CH$_3$ | |
| Cl | 3-CH$_2$Cl | 5-NO$_2$ | |

TABLE I-continued

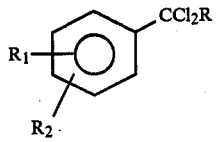

| R | $R_1$ | $R_2$ | Properties |
|---|---|---|---|
| Cl | 3-$CH_2Cl$ | 4-CN | |
| Cl | 3-$CH_2Cl$ | 4-Cl | |
| Cl | 3-$NO_2$ | 5-$C_4H_9$ | |
| Cl | 3-$NO_2$ | 4-$OC_4H_9$ | |
| Cl | 3-$CHF_2$ | 4-$NO_2$ | |
| Cl | 4-$CH_2F$ | 3-$NO_2$ | |
| $CH_3$ | H | 4-$NO_2$ | 100/0.5μ |
| $CH_3$ | H | 4-Cl | |
| $CH_3$ | H | 3-CN | |
| $CH_3$ | H | 4-$SO_2CH_3$ | |
| $CH_3$ | 3-$NO_2$ | 4-$NO_2$ | |
| $CH_3$ | 3-Cl | 4-$NO_2$ | |

TABLE II

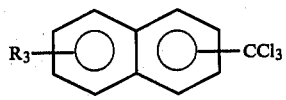

| $CCl_3$ | $R_3$ |
|---|---|
| 1-$CCl_3$ | 4-$NO_2$ |
| 1-$CCl_3$ | 6-$NO_2$ |
| 1-$CCl_3$ | 4-CN |
| 1-$CCl_3$ | 4-$SO_2CH_3$ |
| 1-$CCl_3$ | 4-$CF_3$ |
| 1-$CCl_3$ | 4-$CO_2CH_3$ |
| 1-$CCl_3$ | 4-Cl |
| 2-$CCl_3$ | 5-$NO_2$ |
| 2-$CCl_3$ | 8-$SO_2CH_3$ |
| 2-$CCl_3$ | 6-$CF_3$ |
| 2-$CCl_3$ | 8-CN |
| 2-$CCl_3$ | 6-$CCl_3$ |

Formulation

The nitrification inhibitors of this invention may be applied alone or in conjunction with a reduced-nitrogen fertilizer, e.g., anhydrous ammonia, aqueous ammonia, ammonium sulfate, ammonium nitrate and ammonium phosphate. For convenience, it is preferred to admix the nitrification inhibitors with fertilizer prior to application. Useful formulations of the compounds of Formulas I and II can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1% to 99% by weight of active ingredient(s) and at least one of (a) about 0.1% to 20% surfactant(s) and (b) about 5% to 99% solid or liquid diluent(s). More specifically, they will contain these ingredients in the following approximate proportions:

| | Active Ingredient | Percent by Weight Diluent(s) | Surfactant(s) |
|---|---|---|---|
| Wettable Powders | 20-90 | 0-74 | 1-10 |
| Oil Suspensions, | 5-50 | 40-95 | 0-15 |
| Emulsions, Solutions, (including Emulsifiable Concentrates) | | | |
| Aqueous Suspension | 10-50 | 40-84 | 1-20 |
| Dusts | 1-25 | 70-99 | 0-5 |
| Granules and Pellets | 1-95 | 5-99 | 0-15 |
| High Strength Compositions | 90-99 | 0-10 | 0-2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing.

Typical solid diluents are described in Watkins, et al., "Handbook of Insecticide Dust Diluents and Carriers", 2nd Ed., Dorland Books, Caldwell, N.J. The more absorptive diluents are preferred for wettable powders and the denser ones for dusts. Typical liquid diluents and solvents are described in Marsden, "Solvents Guide," 2nd Ed., Interscience, New York, 1950. Solubility under 0.1% is preferred for suspension concentrates; solution concentrates are preferably stable against phase separation at 0° C. "McCutcheon's Detergents and Emulsifiers Annual", Allured Publ. Corp., Ridgewood, N.J., as well as Sisely and Wood, "Encyclopedia of Surface Active Agents", Chemical Publ. Co., Inc., New York, 1964, list surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules and pellets may be made by spraying the active material upon preformed granular carriers or by agglomeration techniques. See J. E. Browning, "Agglomeration", Chemical Engineering, Dec. 4, 1967, pp. 147ff. and "Perry's Chemical Engineer's Handbook", 4th Ed., McGraw-Hill, New York, 1963, pp. 8-59ff.

For further information regarding the art of formulation, see for example:

J. B. Buchanan, U.S. Pat. No. 3,576,834, Apr. 27, 1971, Col. 5, Line 36, through Col. 7, Line 70 and Ex. 1-4, 17, 106 and 123-140.

R. R. Shaffer, U.S. Pat. No. 3,560,616, Feb. 2, 1971, Col. 3, Line 48 through Col. 7, Line 26 and Examples 3-9 and 11-18.

E. Somers, "Formulation", Chapter 6 in Torgeson, "Fungicides", Vol. I, Academic Press, New York, 1967.

The following examples serve to illustrate a number of the ways in which the compounds of this invention may be formulated.

EXAMPLE 3

| Wettable Powder | |
|---|---|
| 4-(methylsufonyl)-α,α,α-trichlorotoluene | 40% |
| dioctyl sodium sulfosuccinate | 1.5% |
| sodium ligninsulfonate | 3% |
| low viscosity methyl cellulose | 1.5% |
| attapulgite | 54% |

The ingredients are thoroughly blended, passed through an air mill, to produce an average particle size under 15 microns, reblended, and sifted through a U.S.S. No. 50 sieve (0.3 mm opening) before packaging.

All compounds of the invention may be formulated in the same manner.

EXAMPLE 4

| Wettable Powder | |
|---|---|
| 4-nitro-α,α,α-trichlorotoluene | 50% |
| sodium alkylnaphthalenesulfonate | 2% |
| low viscosity methyl cellulose | 2% |
| diatomaceous earth | 46% |

The ingredients are blended, coarsely hammermilled and then air milled to produce particles of active essentially below 10 microns in diameter. The product is reblended before packaging.

EXAMPLE 5

| Aqueous Suspension | |
|---|---|
| 4-(methylsulfonyl)-α,α,α-trichlorotoluene | 25% |
| hydrated attapulgite | 3% |
| crude calcium ligninsulfonate | 10% |
| sodium dihydrogen phosphate | 0.5% |
| water | 61.5% |

The ingredients are ground together in a ball or roller mill until the solid particles have been reduced to diameters under 10 microns.

EXAMPLE 6

| Aqueous Suspension | |
|---|---|
| 4-nitro-α,α,α-trichlorotoluene | 50.0% |
| polyacrylic acid thickener | 0.3% |
| dodecylphenol polyethylene glycol ether | 0.5% |
| disodium phosphate | 1.0% |
| monosodium phosphate | 0.5% |
| polyvinyl alcohol | 1.0% |
| pentachlorophenol | 0.4% |
| water | 46.3% |

The ingredients are ground together in a sand mill to produce particles essentially all under five microns in size.

EXAMPLE 7

| Emulsifiable Concentrate | |
|---|---|
| 4-(methylsulfonyl)-α,α,α-trichlorotoluene | 30% |
| blend of oil soluble sulfonates and polyoxyethylene ethers | 4% |
| xylene | 66% |

The ingredients are combined and stirred with gentle warming to speed solution. A fine screen filter is included in packaging operation to insure the absence of any extraneous undissolved material in the product.

EXAMPLE 8

| Emulsifiable Concentrate | |
|---|---|
| 4-nitro-α,α,α-trichlorotoluene | 20% |
| chlorobenzene | 74% |
| sorbitan monostearate and polyoxyethylene condensates thereof | 6% |

The ingredients are combined and stirred to produce a solution which can be emulsified in water for application.

EXAMPLE 9

| Granule | |
|---|---|
| Wettable powder of Example 4 | 5% |
| attapulgite granules (U.S.S. 20–40 mesh) | 95% |

A slurry of the wettable powder containing approximately 25% solids is sprayed onto the surface of the granules, which are being tumbled in a doublecone blender. After the spraying is complete, the wet granules are dried and packaged. These granules may then be admixed and used with dry application granular fertilizers, such as pulled urea.

EXAMPLE 10

| Low Strength Granule | |
|---|---|
| 4-(methylsulfonyl)-α,α,α-trichlorotoluene | 1% |
| granular fertilizer | 99% |

The active ingredient is dissolved in a suitable solvent, such as xylene or a hydrocarbon oil, and sprayed onto the granular fertilizer which is tumbling in a blender. After the spraying is complete, the product is warmed to evaporate the solvent. The product is then allowed to cool and finally packaged.

EXAMPLE 11

| Extruded Pellet | |
|---|---|
| 4-(methylsulfonyl)-α,α,α-trichlorotoluene | 25% |
| sodium sulfate | 5% |
| crude ligninsulfonate salt (containing 5–20% of the natural sugars) | 10% |
| sodium alkylnaphthalenesulfonate | 1% |
| bentonite clay (non-swelling) | 59% |

The ingredients are blended, hammer-milled and then moistened with about 10–12% water. The mixture is extended as cylinders about 1–3 mm in diameter, which are cut to produce pellets about 1–3 mm long. After drying, these pellets may be used directly or mixed (in the proper proportions) with dry, granular fertilizer granules and applied as a mixture.

Utility

To inhibit the growth of Nitrosomonas, and thereby to suppress the nitrification of ammonium nitrogen in soil according to this invention, soil is treated with an effective amount of one or more compounds of Formulas I or II by any convenient method. For example, the compounds or compositions containing them may be mechanically mixed with the soil or may be distributed on the surface of the soil and then mixed into the soil by plowing the soil. Fertilizer compositions containing the compounds of Formulas I or II can be administered in the same manner as of administering an ordinary fertilizer.

An amount of compounds of Formulas I or II effective to inhibit the growth of Nitrosomonas and to suppress the nitrification of ammonium nitrogen in the soil will depend upon the particular situation. Thus, in determing the amount to be employed, consideration is made not only of the treatment need, i.e., soil pH, temperature, soil type, etc., but also of the mode of application to the soil. When the compounds are to be applied in a broadcast application, the amount in ppm may frequently be less than in row or band application where, for a substantial depth and width within the vicinity of application, there can be a very high concentration of the nitrification-inhibiting compounds. When application is made near the root zone or growing plants or when application is made immediately prior to seeding or transplanting, the amounts supplied are frequently at a lower rate than when application is made at the end of the growing season to prepare the soil for the following season. Generally speaking, an amount effective to inhibit the growth of Nitrosomonas and to suppress the nitrification of ammonium nitrogen will be in the range of about 0.1 to 100 ppm by weight of growth medium.

The effectiveness of the compounds of Formulas I and II as nitrification inhibitors was determined in in vitro tests and in a field test, as described below.

Test A

A solution or suspension of test compound at a nominal final concentration of 0.4 ppm is added to a freshly inoculated liquid culture of *Nitrosomonas europea*. The medium contains $NH_4^+$ and $HCO_3^-$ as the sole primary substrates and cresol red as pH indicator. The pH (initially 8.4) drops rapidly with growth of the bacteria. Failure of the indicator to turn yellow within four days incubation at 28°–30° C. is considered a positive test for inhibitor activity. The results are tabulated in Table III. In this table, compounds are given an activity rating between 0 to +5, based on the minimum concentration of compound effective to produce a positive test for inhibitor activity. The ratings are defined as follows:

| Activity Rating | Minimum Inhibitory Concentration (ppm) |
|---|---|
| +5 | <.08 |
| +4 | <.16 |
| +3 | <.4 |
| +2 | <1. |
| +1 | <2. |
| 0 | no inhibition at 2 ppm |

TABLE III

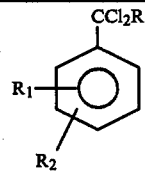

| Compound No. | R | $R_1$ | $R_2$ | Activity Rating |
|---|---|---|---|---|
| 1 | Cl | 4-CN | H | +4 |
| 2 | Cl | 3-$NO_2$ | H | +4 |
| 3 | Cl | 4-$SO_2CH_3$ | H | +5 |
| 4 | Cl | 4-$CO_2CH_3$ | H | +3 |
| 5 | Cl | 2-$NO_2$ | H | +4 |
| 6 | Cl | 4-Cl | H | +5 |
| 7 | Cl | 4-$CF_3$ | H | +4 |
| 8 | Cl | 3-$NO_2$ | 5-$CCl_3$ | +5 |
| 9 | Cl | 3-$NO_2$ | 4-$NO_2$ | +5 |
| 10 | Cl | 2-CN | H | +3 |
| 11 | Cl | 4-$NO_2$ | H | +3 |
| 12 | Cl | 4-CN | 2-Cl | +4 |
| 13 | Cl | 2-CN | 3-Cl | +3 |
| 14 | Cl | 2-CN | 4-Cl | +3 |
| 15 | $CH_3$ | 4-$NO_2$ | H | +5 |
| 16 | H | 2-Cl | 6-Cl | +3 |

Test B

Soil is first washed in at least four changes of distilled water. Typically 500–600 g of soil is suspended in 2 l of water and allowed to settle so that the water can be decanted off. This is necessary to reduce the background level of nitrate ion which interferes with the sensitivity of the assay. After the last wash, a heavy slurry is left in the beaker. To this is added the substrate $(NH_4)HCO_3$ at the rate of 10 ml of a 15% solution per 400 ml of slurry, a nominal concentration of 0.05M. After mixing, the slurry is dispensed into Petri dishes with a tablespoon. Depending upon the exact thickness of the slurry, the dry weight of soil per dish may be between 18 and 24 g; however, uniformity within a given run is within ±1 g.

Test compounds (as 1000 ppm acetone/water/surfactant solutions) are added to each dish. Generally, 20, 70 and 200μ liter aliquots of each compound are tested, corresponding to 1.0, 2.5 and 5.0 ppm nominal levels. The compound was mixed by swirling. When needed, a few drops of water were added to thin the slurry. The inoculum of *Nitrosomonas europea* was added last, 50 μl of a 6–7 day liquid culture. The dishes were then incubated at 30° C. for 3 weeks. They were checked daily and the soil kept just moist with a spray of distilled water as needed.

At the end of the incubation, 1 ml of 3% hydrogen peroxide was added per dish to convert any residual nitrite to nitrate, and the dishes were dried overnight in a 65° oven both to remove the $H_2O_2$ and to check dry weights.

Subsequently, the soil in each dish was suspended in a buffer solution, transferred to a 50 ml beaker and diluted to the 40 ml mark with buffer. After stirring for 20 minutes, the soil was allowed to settle and the supernatant nitrate concentration was read with an "Orion" specific ion electrode. The electrode was frequently standardized against a series of three nitrate standards: 50, 100 and 200 ppm nitrate-N.

The results are shown in Table IV. Compounds are referred to by number as assigned in Table III.

TABLE IV

| Compound No. | Level (ppm) | ppm $NO^-_3$ | % Inhibition |
| --- | --- | --- | --- |
| 1 | 5.0 | 22.43 | 52.6 |
|   | 2.5 | 10.84 | 77.1 |
|   | 1.0 | 46.41 | 2.0 |
| 2 | 5.0 | 14.38 | 69.6 |
|   | 2.5 | 16.23 | 65.7 |
|   | 1.0 | 37.92 | 19.9 |
| 3 | 5.0 | 12.23 | 74.1 |
|   | 2.5 | 11.75 | 75.1 |
|   | 1.0 | 19.87 | 58.0 |
| 6 | 5.0 | 50.32 | 0.0 |
|   | 2.5 | 48.32 | 0.0 |
|   | 1.0 | 46.41 | 2.0 |
| 7 | 5.0 | 41.11 | 13.1 |
|   | 2.5 | 44.57 | 5.8 |
|   | 1.0 | 44.57 | 5.8 |
| 8 | 5.0 | 5.45 | 88.4 |
|   | 2.5 | 6.41 | 86.4 |
|   | 1.0 | 19.87 | 58.0 |
| 9 | 5.0 | 4.11 | 91.3 |
|   | 2.5 | 30.99 | 34.5 |
|   | 1.0 | 46.41 | 2.0 |
| nitrapyrin | 5.0 | 3.36 | 92.9 |
|   | 2.5 | 8.17 | 82.7 |
|   | 1.0 | 19.08 | 59.7 |
| Control | — | 48.32 | 0.0 |

Test C

Field grade soil is heat sterilized and subsequently washed four times with sterile purified water. Before decanting the fourth wash water, the pH of the soil/water mix is adjusted to 7.0.

To a 25 g soil slurry is added 1 ml of a 7-day old *Nitrosomonas* sp. culture and 0.1 ml of a 10% ammonium bicarbonate selection. After a thorough agitation, the sterile petri dishes containing the above mixtures remain at room temperature for four hours.

Two replicates of two rates (6 and 3 ppm) of each chemical are prepared. Formulation consists of acetone and sterile purified water containing 250 ppm Trem 014 surfactant being added stepwise to an appropriate amount of chemical. Should the chemical not be adequately solubilized or dispersed, the solution is agitated in a Waring blender.

An aliquot appropriate to give 6 or 3 ppm when added to 25 g of soil slurry is removed from each chemical solution. This is again thoroughly mixed and the closed plates are placed in a 25° C. humidity chamber for fifteen days. Three times during that period the plates are placed in a 30° C. incubator for twenty-four hours.

At the end of the fifteen day incubation period, the contents of each plate is placed in 40 ml of a standard Nitrosomonas growth medium in a 125 ml erlenmyer flask. Flasks are placed on a shaker in a 27° C. growth room for eight days.

At that time, pH is recorded for each replicate of each treatment. The contents of each flask is then analyzed for nitrite ions. The standard, nitrapyrin, will have no nitrite ion present at 6 ppm and usually 2 to 20 ppm nitrite ions present at the 3 ppm treatment level. Untreated check soil samples will normally contain 100 to 160 ppm nitrite ion concentration. The lower the nitrite ion concentration in a sample, the greater the activity of the test compound as a nitrification inhibitor. Results are presented in Table V.

TABLE V

| Compound No. | Test Compound (ppm) | Nitrite Ions (ppm) |
| --- | --- | --- |
| 2 | 6 | 0 |
|   | 3 | 38 |
| 3 | 6 | 0 |
|   | 3 | 0 |
| 11 | 6 | 0 |
|   | 3 | 56 |
| 13 | 6 | 0 |
|   | 3 | 3 |
| 14 | 6 | 0 |
|   | 3 | 0 |
| nitrapyrin | 6 | 0 |
|   | 3 | 93 |
| Control* |   | 142 |
|   |   | 164 |
|   |   | 130 |
|   |   | 175 |

*Nitrite ion levels for four representative tests are provided.

Test D

A field experiment was conducted from November 1980 to corn harvest in 1981 to evaluate two experimental nitrification inhibitors, compounds 3 and 11. Treatments consisted of a check plot (no nitrogen fertilizer), anhydrous ammonia applied in the fall and spring at rates of 60 and 120 pounds N (nitrogen) per acre, anhydrous ammonia applied in the fall at rates of 60 and 120 pounds N per acre with 0.5 pounds of nitrapyrin or etridiazol per acre, and anhydrous ammonia applied in the fall at rates of 60 and 120 pounds of N per acre with 0.25 and 1.0 pounds of Compounds 3 or 11 per acre. All fall applications were made on Nov. 11, 1980 (soil temperature was 51.5° F.) and spring applications were made on Mar. 24, 1981 (soil temperature was 40° F.). Inhibitors were added to anhydrous ammonia by an electrically driven positive displacement pump injecting a nonaqueous solution of the chemical into the ammonia stream between the ammonia reservoir and the distributor manifold.

The experimental area was a tile-drained Chalmers silty clay loam soil with a pH value of 6.2. Plot size was 15×70 feet. The experimental design was a randomized complete block with four replications. The soil was plowed and disked prior to fertilizer application and disked a second time immediately prior to planting. The plots were planted on May 23, 1981 with Becks 65 X seed at a rate sufficient to give a final stand of 26,000 plants per acre. Leaf samples from 15 randomly selected plants were taken from each plot at the 50% silt stage of growth. Grain was harvested on Oct. 29, 1981 by a one row picker sheller. Grain moisture content and grain weight were measured and yields were calculated on a 15.5% moisture basis. Leaf and grain tissues were dried at 60° C., ground to <40 mesh and analyzed for total N. Results are presented in Table VI.

TABLE VI

| N Rate | Time of Application | Inhibitor Type* | Rate lbs/A | Corn Grain Yield bu/A | Grain Protein % |
|---|---|---|---|---|---|
| 0 | — | — | — | 109 | 5.88 |
| 60 | Spring | — | — | 151 | 6.44 |
| 120 | Spring | — | — | 165 | 7.63 |
| 60 | Fall | — | — | 147 | 7.00 |
| 120 | Fall | — | — | 164 | 7.63 |
| 60 | Fall | NS | 0.5 | 155 | 7.69 |
| 120 | Fall | NS | 0.5 | 154 | 7.81 |
| 60 | Fall | #3 | 0.25 | 158 | 7.50 |
| 120 | Fall | #3 | 0.25 | 166 | 8.00 |
| 60 | Fall | #3 | 1.0 | 166 | 7.50 |
| 120 | Fall | #3 | 1.0 | 161 | 7.75 |
| 60 | Fall | #11 | 0.25 | 164 | 7.75 |
| 120 | Fall | #11 | 0.25 | 166 | 7.88 |
| 60 | Fall | 11 | 1.0 | 150 | 7.19 |
| 120 | Fall | 11 | 1.0 | 161 | 7.69 |
| 60 | Fall | DW | 0.5 | 145 | 7.56 |
| 120 | Fall | DW | 0.5 | 153 | 7.50 |

*NS = nitrapyrin
DW = etridiazol

A good response to N was obtained with both fall and spring applied anhydrous ammonia. However, little N was lost following application of anhydrous ammonia in the fall as shown by the similar yields obtained from addition of equivalent amounts of N in spring and fall. Addition of nitrapyrin or etridiazol to fall-applied N had no significant effect upon yield. However, the addition of Compound 3 at a rate of 1 pound per acre to anhydrous ammonia applied at 60 pounds of N per acre increased yields by 19 bushels per acre. The addition of Compound 3 (0.25 pound/acre) and Compound 11 (0.25 pound/acre) to anhydrous ammonia applied at 60 pounds of N per acre also increased yields by 11 and 17 bushels/acre, respectively. However, these later yield increases were not statistically significant. None of the inhibitors tested increased corn yields when added to anhydrous ammonia applied at a rate of 120 pounds of N/acre.

Nitrification inhibitor application had no significant effect upon the total N concentrations in corn grain tissue.

What is claimed is:

1. A method of inhibiting the nitrification of ammonium nitrogen in soil comprising treating the soil with an effective amount of one or more compounds of the formulas

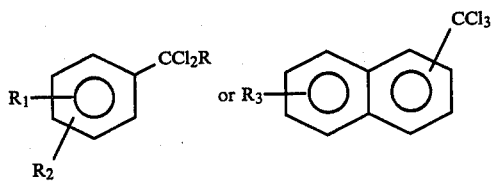

wherein
R is Cl or $CH_3$;
$R_1$ is H, F, Cl, Br, CN, $NO_2$, $SO_2R_4$, $CO_2R_5$ or methyl substituted with 1-3 atoms of F or Cl;
$R_2$ is H, Cl, $NO_2$, $CF_3$, $C_1$-$C_4$ alkyl or $C_1$-$C_4$ alkoxy;
$R_3$ is H, Cl, $NO_2$ or $SO_2CH_3$, $CH_3$, $OCH_3$; and
$R_4$ and $R_5$ are independently $C_1$-$C_3$ alkyl provided that when $R_2$ is other than H and when $R_1$ and $R_2$ are bonded to the 2, 6 positions of the benzene ring, then $R_1$ and $R_2$ are both Cl.

2. A method of inhibiting the growth of Nitrosomonas comprising treating the soil with an effective amount of one or more compounds of the formulas

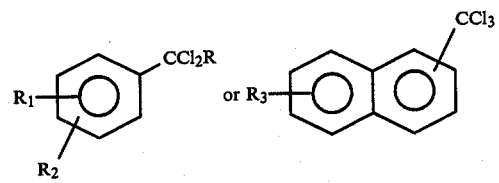

wherein
R is Cl or $CH_3$;
$R_1$ is H, F, Cl, Br, CN, $NO_2$, $SO_2R_4$, $CO_2R_5$ or methyl substituted with 1-3 atoms of F or Cl;
$R_2$ is H, Cl, $NO_2$, $CF_3$, $C_1$-$C_4$ alkyl or $C_1$-$C_4$ alkoxy;
$R_3$ is H, Cl, $NO_2$ or $SO_2CH_3$, $CH_3$, $OCH_3$; and
$R_4$ and $R_5$ are independently $C_1$-$C_3$ alkyl provided that when $R_2$ is other than H and when $R_1$ and $R_2$ are bonded to the 2, 6 positions of the benzene ring, then $R_1$ and $R_2$ are both Cl.

3. A method of either claim 1 or claim 2 where R is Cl and $R_2$ is H, Cl, $NO_2$, $CF_3$, $CH_3$ or $OCH_3$.

4. A method of claim 3 where $R_2$ is H, Cl, $NO_2$ or $CF_3$.

5. A method of claim 4 where $R_1$ is F, Cl, $NO_2$, $CF_3$, $CCl_3$, $SO_2R_4$, $CO_2CH_3$ or CN; and $R_2$ is H, $NO_2$ or $CF_3$.

6. A method of claim 5 where $R_1$ is $NO_2$, $CF_3$, $CCl_3$ or $SO_2CH_3$; $R_2$ is H; and $R_1$ is bonded to the 3- or the 4-position of the benzene ring.

7. The method of claim 6 where the compound is 4-nitro-α,α,α-trichlorotoluene.

8. The method of claim 6 where the compound is 4-(methylsulfonyl)-α,α,α-trichlorotoluene.

9. An agricultural composition comprising a reduced nitrogen fertilizer in admixture with a nitrification-inhibiting amount of one or more compounds of the formulas

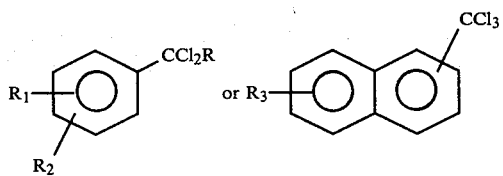

wherein
R is Cl or $CH_3$;
$R_1$ is H, F, Cl, Br, CN, $NO_2$, $SO_2R_4$, $CO_2R_5$ or methyl substituted with 1–3 atoms of F or Cl;
$R_2$ is H, Cl, $NO_2$, $CF_3$, $C_1$–$C_4$ alkyl or $C_1$–$C_4$ alkoxy;
$R_3$ is H, Cl, $NO_2$ or $SO_2CH_3$, $CH_3$, $OCH_3$; and
$R_4$ and $R_5$ are independently $C_1$–$C_3$ alkyl provided that when $R_2$ is other than H and when $R_1$ and $R_2$ are bonded to the 2, 6 positions of the benzene ring, then $R_1$ and $R_2$ are both Cl.

10. A composition of either claim 9 where R is Cl and $R_2$ is H, Cl, $NO_2$, $CF_3$, $CH_3$ or $OCH_3$.

11. A composition of claim 10 where $R_2$ is H, Cl, $No_2$ or $CF_3$.

12. A composition of claim 11 where $R_1$ is F, Cl, $NO_2$, $CF_3$, $CCl_3$, $SO_2R_4$, $CO_2CH_3$ or CN; and $R_2$ is H, $NO_2$ or $CF_3$.

13. A composition of claim 12 where $R_1$ is $NO_2$, $CF_3$, $CCl_3$ or $SO_2CH_3$; $R_2$ is H; and $R_1$ is bonded to the 3- or the 4-position of the benzene ring.

14. A composition of claim 13 where the compound is 4-nitro-α,α,α-trichlorotoluene.

15. A composition of claim 13 where the compound is 4-(methylsulfonyl)-α,α,α-trichlorotoluene.

* * * * *